(12) United States Patent
Zou et al.

(10) Patent No.: US 12,530,094 B2
(45) Date of Patent: Jan. 20, 2026

(54) TOUCH CONTROL MODULE, TOUCH CONTROL PANEL, AND HOME APPLIANCE

(71) Applicant: BSH Hausgeräte GmbH, Munich (DE)

(72) Inventors: Qingqiang Zou, Nanjing (CN); Ming Zang, Nanjing (CN); Xuemei Bai, Nanjing (CN); Jun Li, Nanjing (CN)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/632,986

(22) Filed: Apr. 11, 2024

(65) Prior Publication Data

US 2024/0361854 A1 Oct. 31, 2024

(30) Foreign Application Priority Data

Apr. 26, 2023 (CN) .......................... 202320981486.6

(51) Int. Cl.
*G06F 3/041* (2006.01)
(52) U.S. Cl.
CPC .................................. *G06F 3/041* (2013.01)
(58) Field of Classification Search
CPC ........ G06F 3/041; H03K 2217/960755; H03K 2217/96076; H03K 2217/96079; H03K 17/9622
See application file for complete search history.

(56) References Cited

U.S. PATENT DOCUMENTS

| 4,293,745 A | 10/1981 | Matsuda et al. | |
| 2014/0016046 A1* | 1/2014 | Zarcone | B60K 35/00 349/12 |
| 2016/0149571 A1* | 5/2016 | Heimann | H03K 17/962 200/600 |
| 2017/0047929 A1* | 2/2017 | Banfield | H03K 17/962 |
| 2017/0179952 A1* | 6/2017 | Zhang | H03K 17/975 |

FOREIGN PATENT DOCUMENTS

| DE | 202014101253 U1 | 5/2014 | |
| DE | 102018002715 A1 | 10/2019 | |
| EP | 2045923 A1 * | 4/2009 | ........... D06F 39/005 |
| WO | 2008035838 A1 | 3/2008 | |

* cited by examiner

*Primary Examiner* — Temesghen Ghebretinsae
*Assistant Examiner* — Sosina Abebe
(74) *Attorney, Agent, or Firm* — Laurence A. Greenberg; Werner H. Stemer; Ralph E. Locher

(57) ABSTRACT

A touch control module of a touch control panel includes a circuit module and elastic conductors on a first surface of the circuit module. A support is arranged on the first surface of the circuit module. Positioning portions corresponding to the elastic conductors are provided on the support. Isolation members are arranged on the positioning portions. The elastic conductors at least partially extend into the positioning portions and abut against inner surfaces of the isolation members. Limiting portions of the isolation members abut against edges of the positioning portions to limit the isolation members to the positioning portions. The isolation members are thus limited to the positioning portions, and a stroke and a position of the isolation members are limited by using the support. The fitted structure is more stable. There is also described a home appliance with the touch control panel.

14 Claims, 4 Drawing Sheets

A-A

C-C

TOUCH CONTROL MODULE, TOUCH CONTROL PANEL, AND HOME APPLIANCE

CROSS-REFERENCE TO RELATED APPLICATION

This application claims the priority, under 35 U.S.C. § 119, of Chinese Patent Application CN202320981486.6, filed Apr. 26, 2023; the prior application is herewith incorporated by reference in its entirety.

FIELD AND BACKGROUND OF THE INVENTION

The utility model relates to the technical field of home appliances, and in particular, to a touch control module, a touch control panel and a home appliance.

As technologies develop, touch technology is used on increasing home appliances to realize human-machine interaction.

In the prior art, capacitive touch sensing technology may be used to operate and control home appliances. An implementation of capacitive touch sensing technology is to use a spring as a capacitive trigger medium. When a user touches a corresponding button or icon on a touch control panel, the spring can detect the touch operation signal of the user on the touch control panel, thereby controlling a home appliance based on the operation signal.

In the touch sensing solution using a spring, one end of the spring is usually arranged on a circuit board, and the other end is oriented toward and is in contact with a front cover plate. Since the spring is a conductor, which may result in a safety risk, to meet safety requirements, an insulation or isolation structure is usually arranged between the spring and the front cover plate to electrically isolate the circuit board.

In the prior art, common manners of realizing an isolation structure include wrapping a spring with a plastic member, embedding a plastic member into a center of a spring, and the like. However, the prior art does not take fitting stability of the plastic member and the spring into consideration, which leads to foreseeable risks. For example, the plastic member is separated from the spring and malfunctions, or a fitting risk of the spring and the plastic part is increased during fitting of the touch control panel.

SUMMARY OF THE INVENTION

It is accordingly an object of the invention to provide an assembly which overcomes the above-mentioned disadvantages of the heretofore-known devices and methods of this general type and which provides for an improved touch control module, touch control panel, and home appliance thereof.

With the above and other objects in view there is provided, in accordance with the invention, a touch control module, comprising:
 a circuit module having a first surface, and elastic conductors disposed on said first surface;
 a support disposed on said first surface of said circuit module, said support having positioning portions corresponding to said elastic conductors; and
 isolation members arranged on said positioning portions and being formed with limiting portions;
 said elastic conductors at least partially extending into said positioning portions and abutting against inner surfaces of said isolation members, and said limiting portions abutting against edges of said positioning portions to fit said isolation members to said positioning portions.

In other words, the objects of the invention are achieved with a touch control module, which includes: a circuit module, provided with a first surface, where the first surface is provided with elastic conductors; and a support, arranged on the first surface of the circuit module, where positioning portions corresponding to the elastic conductors are provided on the support. The touch control module further includes isolation members, where the isolation members are provided with limiting portions, the isolation members are arranged on the positioning portions, the elastic conductors at least partially extend into the positioning portions and abut against inner surfaces of the isolation members, and the limiting portions abut against edges of the positioning portions to limit the isolation members to the positioning portions. Through the above solution, the isolation members are limited to the positioning portions, and a stroke and a position of the isolation members are limited by using the support, so that a fitted structure is more stable.

Further, by limiting the isolation members to the positioning portions, fitting and transportation of the touch control module are more convenient. Specifically, a supplier and a buyer have different factories or assembly works. In some cases, the supplier only needs to provide the touch control module, and the buyer needs to fit the touch control module to another component after obtaining the component. Therefore, limiting the isolation members to the positioning portions in the touch control module facilitates transportation of the touch control module, avoids loss of components, and facilitates fitting by the buyer.

In a possible embodiment, the positioning portions are of a through hole structure formed on the support. The through hole structure is provided on the touch control module, the isolation members are embedded therein in a free state, and the isolation members are limited to the support through an elastic compression force of the elastic conductors.

In a possible embodiment, the isolation members are movably arranged on the positioning portions in a direction perpendicular to a front cover plate. In this way, the isolation members not only can be limited to the front cover plate and the support without separation, but also can elastically expand and contract in an axial direction of the positioning portions within a specific range.

In a possible embodiment, the isolation members further include walls extending in an axial direction of the elastic conductors, and the limiting portions extend radially outwards from the walls. Preferably, the isolation members are formed in the shape of a hat, and the limiting portions are of a brim structure extending radially outwards from edges of the isolation members. The structure in the shapes of the hat and the brim not only facilitates integral formation, but also facilitates setting of a position and an expansion and contraction stroke of the isolation members at the positioning portions.

In a possible embodiment, the limiting portions include a plurality of protrusions, and the protrusions are distributed on the walls.

In a possible embodiment, the support includes a surface facing away from the circuit module. After the circuit module is fitted to the support, under an action of the elastic conductors, the isolation members at least partially extend out of the surface by a specific height. In this way, the isolation members can have a specific expansion and extraction stroke. Therefore, when the touch control module is subsequently fitted to the front cover plate, the isolation members can be maintained in close contact with the front cover plate, without affecting detection sensitivity of a touch key. In addition, the isolation members do not generate an excessive force that damages the front cover plate. Preferably, the height is 2 mm.

In a possible embodiment, gaps are formed radially between the isolation members and the positioning portions, to ensure that the isolation members can move flexibly, and prevent problems that lead to poor contact such as jamming and tilting.

In a possible embodiment, a thickness of the isolation members in an axial direction is in a range of 0.7 mm to 1.0 mm. This embodiment can meet strength requirements on the isolation members while ensuring that a corresponding touch signal can be detected by the touch key.

In a possible embodiment, the isolation members are made of plastic. Because the plastic material is softer than a metal member, the plastic material can abut against the front cover plate desirably without scratching and wearing the front cover plate, thereby avoiding impact on an appearance of the touch control panel.

In a possible embodiment, the touch control module further includes a display film. The support includes light guide portions. The display film is arranged on a side of the support close to a front cover plate and covers the light guide portions.

With the above and other objects in view there is also provided, in accordance with the invention, a touch control panel, including the foregoing touch control module and a front cover plate. The front cover plate is arranged on a side of the support away from the circuit module, and abuts against the isolation members. In the foregoing solution, an additional isolation member structure is added between the elastic conductors and the front cover plate, and a stroke and a position thereof are limited by using the support, so that the fitted structure is more stable. In addition, it is ensured that the isolation members can be maintained in close contact with the elastic conductors and the front cover plate, without affecting the touch sensitivity.

With the above and other objects in view there is also provided, in accordance with the invention, a home appliance that includes the foregoing touch control panel. An additional isolation member structure is added between the elastic conductors and the front cover plate, and a stroke and a position thereof are limited by using the support, to ensure that the isolation members can keep close contact, ensure touch sensitivity of the touch control panel, and improve user experience of the home appliance.

Other features which are considered as characteristic for the invention are set forth in the appended claims.

Although the invention is illustrated and described herein as embodied in a touch control module, touch control panel, and a home appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Home appliances are usually provided with a human-machine interaction component, such as a touch control panel. Users are able to control an operation of the home appliance by using the touch control panel.

Figure 1:
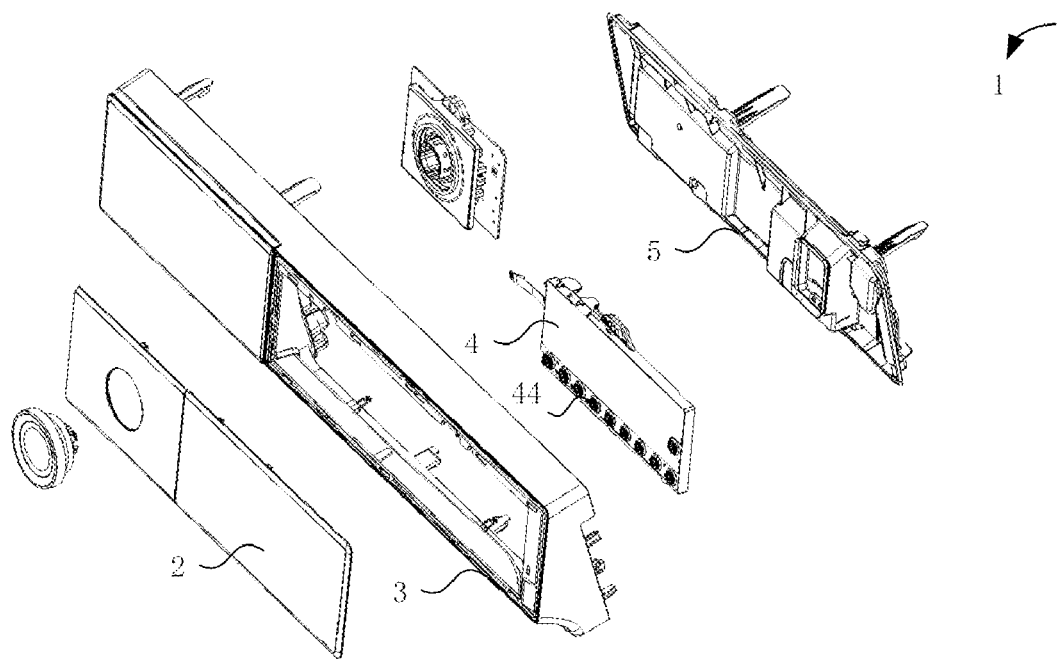
FIG. 1 is a schematic exploded perspective view of a touch control panel according to an embodiment of the utility model.
Figure 2:
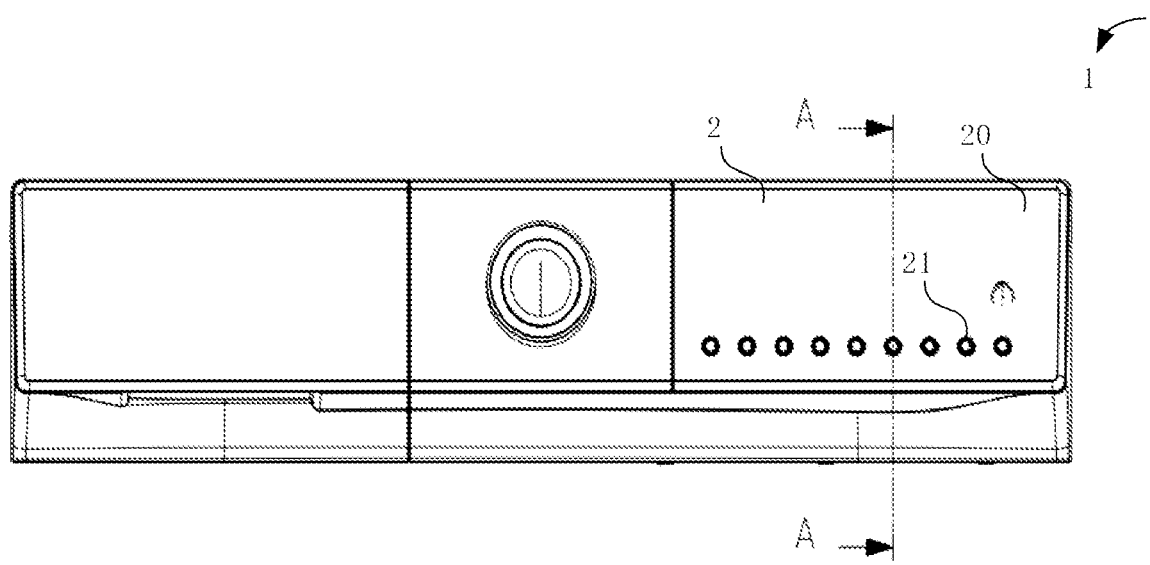
FIG. 2 is a front view of the touch control panel in FIG. 1.

FIG. 1 is an exploded view of components of a touch control panel 1, in a perspective view. FIG. 2 is a front view of the components of the touch control panel 1 after fitting. As shown in FIG. 1, the touch control panel 1 includes a front cover plate 2, a supporting portion 3, and a touch control module 4. An opening is provided on the supporting portion 3. The touch control module 4 is arranged at the opening of the supporting portion 3 and abuts against the front cover plate 2.

The touch control panel 1 further includes a rear cover plate 5, which may be connected to the supporting portion 3 and can abut against the touch control module 4, so that a side of the touch control module 4 facing the front cover plate 2 is more snugly attached to the front cover plate.

The front cover plate 2, the touch control module 4, and the rear cover plate 5 may be arranged on the supporting portion 3, and then the assembly of the components may be fitted to the home appliance as a whole.

As shown in FIG. 2, the front cover plate 2 is provided with a main body portion 20. The main body portion 20 is provided with touch key regions 21. A user may perform operations by touching indicator patterns corresponding to the touch key regions 21 or by touching corresponding touch keys 44. Functions of the touch keys 44 are implemented by using the touch control module 4.

In an embodiment, the front cover plate 2 may be made of glass or plastic. Preferably, a pattern of the touch key regions 21 may be provided on a side of the front cover plate 2 facing the touch control module 4, to prevent the pattern being worn after long-term use.

As shown in FIG. 1, the touch control module 4 may be provided with the touch keys 44, which are configured to detect a touch of a user. The touch control module 4 may be further provided with a display assembly, which is configured to display content of an interface of the touch control panel, and may be further configured to display corresponding content based on a detected signal indicating that the touch keys 44 are being operated.

Figure 5:
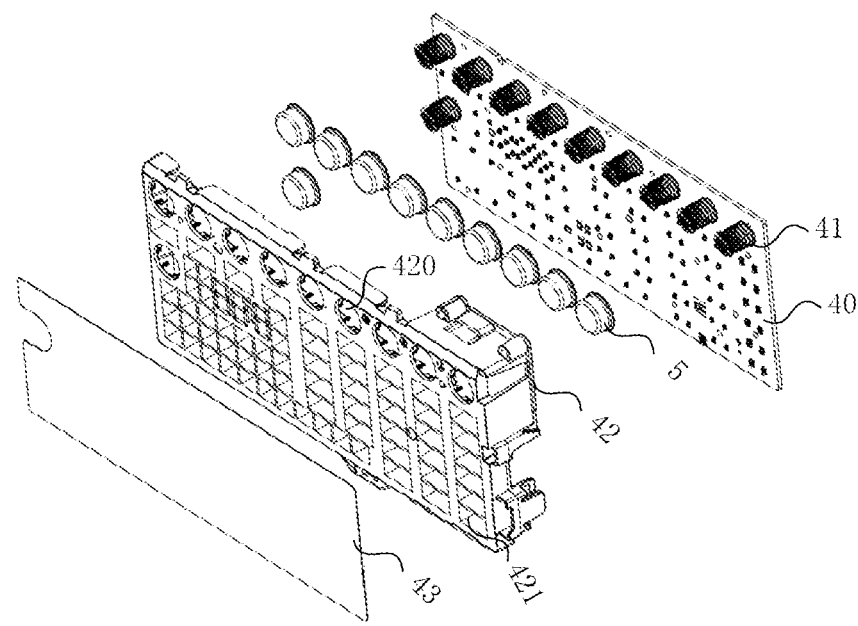
FIG. 5 is a schematic exploded view of a touch control module according to an embodiment of the utility model.

Specifically, FIG. 5 is an exploded view of the touch control module 4. In a stacking order of the components, the touch control module 4 sequentially includes a circuit module 40, a support 42, and a display film 43 from rear to front. The circuit module 40 and the display film 43 are respectively arranged on two sides of the support 42. The support 42 includes light guide portions 421. The display film 43 is arranged on the support 42 and covers the light guide portions 421.

In some embodiments, the circuit module 40 may be provided with lighting lamps such as LED lights to realize backlight. Positions on the support corresponding to the lighting lamps are provided with the light guide portions 421, so that light can be irradiated to the display film 43 through the light guide portions 421.

In some embodiments, the circuit module 40 may be further provided with elastic conductors 41. The elastic conductors 41 can abut against the front cover plate 2, and are in a one-to-one correspondence with the touch key regions 21. A quantity of the elastic conductors 41 may be set according to a quantity of required touch keys.

Generally, the elastic conductors 41 may be springs or elastic pieces of a specific shape.

In an embodiment, the touch control module 4 further includes isolation members 5. Generally, the isolation or insulation members 5 are arranged between the elastic conductors 41 and the front cover plate 2, to isolate a non-safety extra-low voltage, that is, the circuit module 40, to meet a safety requirement. The isolation members are generally made of plastic.

Specifically, according to relevant regulations in the "General Safety Standards for Home Appliances," components in contact with an electrified component need to pass a ball pressure test. However, the front cover plate 2 usually cannot meet the requirement. Therefore, the isolation members 5 are arranged between the elastic conductors 41 and the front cover plate 2, to prevent the front cover plate 2 from failing the ball pressure test. In addition, since plastic is softer than metal and has a smooth surface, the front cover plate can be protected, thereby preventing the front cove plate from being scratched and preventing an appearance of the touch control panel from being affected during assembly and fitting.

In an embodiment, the support 42 is configured with positioning portions 420. Arrangement positions of the positioning portions 420 may correspond to the touch key regions 21 of the front cover plate 2. For example, the positioning portions 420 may be a hole structure on the support 42.

In an embodiment, for assembly convenience of the isolation members 5 and stability of the isolation members after assembly, the isolation members 5 may be arranged on the positioning portions 420 of the support 42, and ends of the elastic conductors 41 abut against the isolation members 5. The isolation members 5 are provided with limiting portions 51, so that the isolation members 5 can be limited to the positioning portions 420. In addition, the isolation members 5 are embedded in the support 42 of the touch control module 4, to facilitate subsequent transportation and fitting of the touch control module 4.

Figure 6:
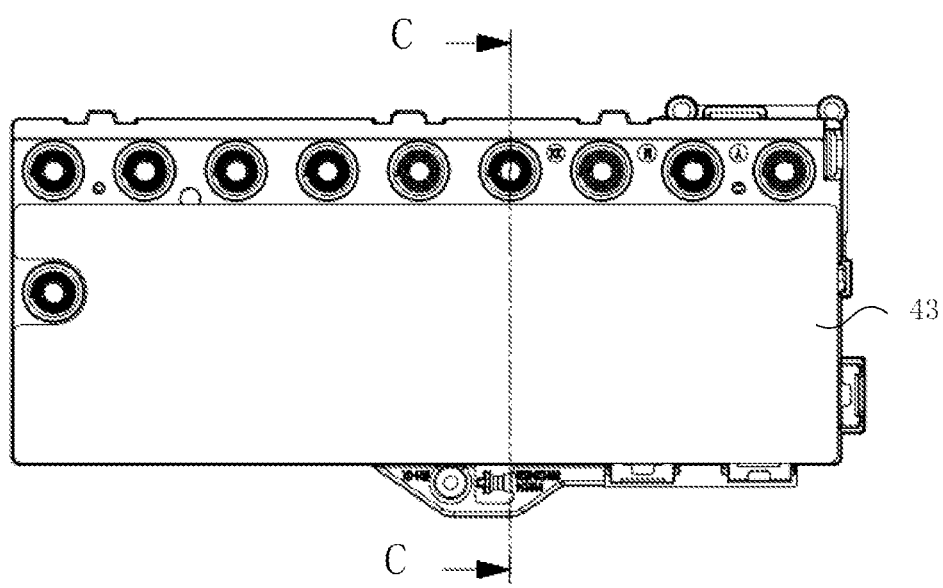
FIG. 6 is a front view of the touch control module in FIG. 5.
Figure 7:
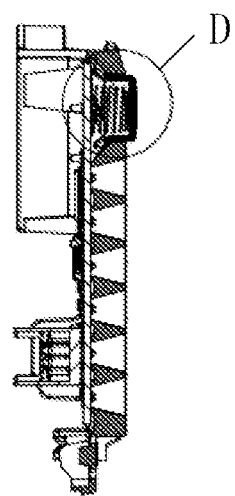
FIG. 7 is a sectional view of the touch control module taken along the line C-C and viewed in the direction of the arrows in FIG. 6.
Figure 8:
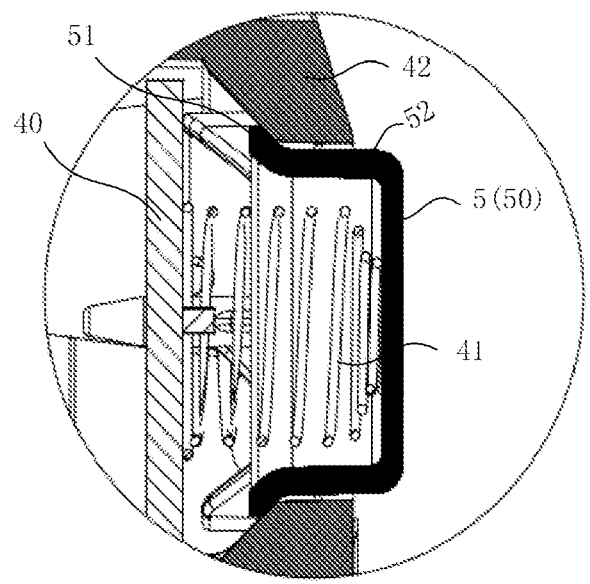
FIG. 8 is an enlarged view of a detail D in FIG. 7.

FIG. 6 to FIG. 8 are schematic diagrams of components of the touch control module 4 after fitting. FIG. 8 is an enlarged sectional view in which the isolation members 5 are fitted to the positioning portions 420. As shown in the figure, the isolation members 5 are fitted to the positioning portions 420, and the elastic conductors 41 can extend into the positioning portions 420 and abut against inner surface of the isolation members 5. In addition, under an action of the elastic conductors 41, the limiting portions 51 of the isolation members 5 abut against the positioning portions 420, to limit the isolation members 5 to the positioning portions 420.

In an embodiment, the isolation members 5, although limited to the positioning portions 420, can move in a direction perpendicular to the front cover plate 2. In this way, after the front cover plate 2 is fitted to the touch control module 4, the isolation members 5 can come into seamless contact with the front cover plate 2 without causing excessive squeeze that damages the front cover plate.

In this embodiment, the support hole structure is provided on the touch control module, the isolation members are embedded therein in a free state, and the isolation members are limited to the support through an elastic compression force of the elastic conductors. In this solution, the isolation members not only can be limited to the support without separation, but also can elastically expand and contract in an axial direction of the positioning portions within a specific range.

In an embodiment, the isolation members 5 may have a plurality of configurations enabling the isolation members to be limited to the positioning portions 420.

Figure 4:
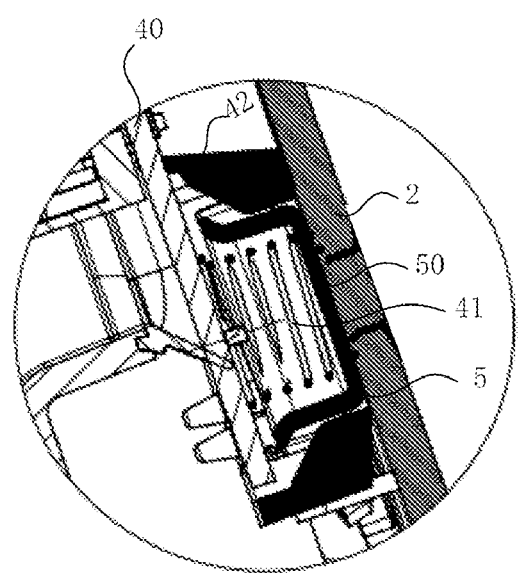
FIG. 4 is an enlarged view of a detail B in FIG. 3.

As shown in FIG. 4 and FIG. 8, the isolation members 5 may include isolation portions 50. The isolation portions 50 are substantially parallel to the front cover plate 2. The isolation members further include walls 52 arranged on the isolation portions 50 and extending in an axial direction of the elastic conductors 41. The limiting portions 51 can extend radially outwards from the walls 52.

Preferably, the isolation members 5 may be constructed in the shape of a hat, and the limiting portions 51 are of a brim structure extending radially outwards from edges of the isolation members 5.

The walls 52 of the isolation members 5 may be peripheral walls arranged on the isolation portions 50. The peripheral walls may surround the elastic conductors 41 in a circumferential direction. The walls may be constructed to include walls distributed on the isolation portions 50 at intervals. The limiting portions 51 may include a plurality of protrusions, and the protrusions are distributed on the walls 52.

The isolation members 5 may alternatively be constructed to include a plurality of claw portions distributed on the isolation portions 50. The limiting portions 51 are constructed as structures extending radially outwards from end portions of the claw portions.

The foregoing epitaxial structure, the brim structure, and the protrusion structures can provide a limiting function. For example, since the elastic conductors 41 abut against the isolation members 5, the isolation members are limited to the positioning portions 420 by the limiting structures, thereby preventing the isolation members from being separated from the positioning portions.

In an embodiment, the support 42 includes a surface facing the front cover plate 2. After the circuit module 40 is fitted to the support 42, under an action of the elastic conductors 41, the isolation members 5 can at least partially extend out of the surface by a specific height. Preferably, the height is 2 mm. In this way, the protruding height enables a protruding surface to be in full contact with the front cover plate after the touch control module 4 is fitted to the front cover plate, thereby ensuring seamless contact. In addition, the isolation members are prevented from generating excessive squeeze that damages the front cover plate.

In an embodiment, gaps are formed radially between the isolation members 5 and the positioning portions 420. The gaps need to be formed within a proper range, to ensure that the isolation members can move flexibly, and prevent problems that lead to poor contact such as jamming and tilting.

In an embodiment, the isolation members 5 are made of plastic, and a thickness of the isolation members in an axial direction is in a range of 0.7 mm to 1.0 mm. Since a principle of the touch keys is to detect a capacitance change in a region when a user touches the keys, to realize effective touch of the touch keys, the thickness of the isolation members arranged between the front cover plate and the elastic conductors cannot be excessively large. This preferred embodiment can meet strength requirements on the isolation members while ensuring that a corresponding touch signal can be detected by the touch key.

Figure 3:
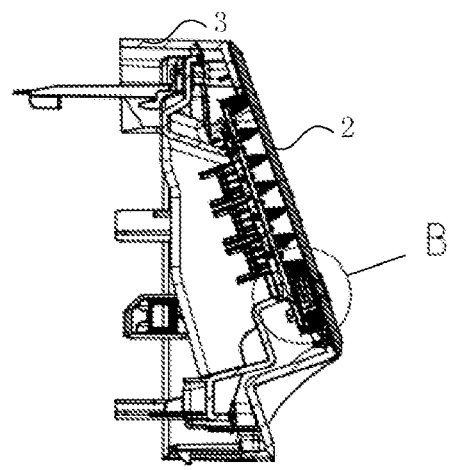
FIG. 3 is a sectional view of the touch control panel taken along the line A-A and viewed in the direction of the arrows in FIG. 2.

FIG. 2 to FIG. 4 are schematic diagrams of the front cover plate and the touch control module after fitting. In an actual fitting process, the assembly of the touch control module 4 and the front cover plate 2 may be arranged on the supporting portion 3. Since the isolation members can at least partially extend out of a surface of the support by a specific height under the support of the elastic conductors, outer surfaces of the isolation members can abut against the front cover plate, thereby limiting the isolation members to the positioning portions. As shown in FIG. 4, after the front cover plate is fitted to the touch control module 4, the isolation members are squeezed by the front cover plate, and therefore retract towards the circuit module by a stroke. An additional isolation member structure is added between the elastic conductors and the front cover plate, and a stroke and a position thereof are limited by using the support, so that the fitted structure is more stable. In addition, it is ensured that the isolation members can keep close contact to provide a trigger function.

In this embodiment, the isolation members are embedded in the positioning portions in a free state by using the elastic conductor. Therefore, when the touch control module is subsequently fitted to the front cover plate, the isolation members can be maintained in close contact with the front cover plate, without affecting detection sensitivity of a touch key.

Although the invention is disclosed as above, the touch control module, the touch control panel, and the home appliance are not limited thereto. Various alterations and modifications may be made by a person skilled in the art without departing from the spirit and scope of the illustrated details, and therefore the protection scope of the assembly should be subject to the scope defined by the claims.

The invention claimed is:

1. A touch control module, comprising:
a circuit module having a first surface, and elastic conductors disposed on said first surface;
a support disposed on said first surface of said circuit module, said support having positioning portions corresponding to said elastic conductors; and
isolation members arranged on said positioning portions, said isolation members having isolation portions and being formed with limiting portions, and said isolation members being formed with walls surrounding the elastic conductors in a circumferential direction;
said elastic conductors at least partially extending into said positioning portions and abutting against inner surfaces of said isolation members, and said limiting portions abutting against edges of said positioning portions to fit said isolation members to said positioning portions; and
said isolation members being movably disposed on said positioning portions in a direction perpendicular to a front cover plate, said isolation members being formed with walls extending in an axial direction of said elastic conductors, and said limiting portions extending radially outwards from said walls; and
said walls of the isolation members being peripheral walls arranged on the isolation portions such that the peripheral walls surrounding the elastic conductors in the circumferential direction.

2. The touch control module according to claim 1, wherein said isolation members are formed in a shape of a hat, with said limiting portions forming a brim structure extending radially outwards from edges of said isolation members.

3. The touch control module according to claim 1, wherein said limiting portions are formed with a plurality of protrusions distributed on said walls.

4. The touch control module according to claim 1, wherein said positioning portions are of a through hole structure formed on said support.

5. The touch control module according to claim 1, wherein said support has a surface facing away from said circuit module and, with said circuit module fitted to said support, said isolation members are subjected to an action of said elastic conductors and said isolation members at least partially extend out of said surface by a specific height.

6. The touch control module according to claim 5, wherein said specific height is 2 mm.

7. The touch control module according to claim 1, wherein gaps are formed radially between said isolation members and said positioning portions.

8. The touch control module according to claim 7, wherein a thickness of said isolation members in an axial direction lies in a range of 0.7 mm to 1.0 mm.

9. The touch control module according to claim 1, wherein said isolation members are made of plastic.

10. The touch control module according to claim 1, which further comprises a display film arranged on a side of said support close to a front cover plate, wherein said support is formed with light guide portions and said display film is disposed to cover said light guide portions.

11. A touch control panel, comprising:
a front cover plate and the touch control module according to claim 1; and
wherein said front cover plate is arranged on a side of the support away from the circuit module, and abuts against the isolation members.

12. The touch control panel according to claim 11, wherein said front cover plate comprises a main body portion, and said main body portion is provided with touch key regions corresponding to the elastic conductors of said touch control module.

13. The touch control panel according to claim 11, which further comprises a supporting portion, wherein said touch control module is arranged on said supporting portion.

14. A home appliance, comprising:
a touch control panel with a front cover plate and a touch control module according to claim 1;
wherein the front cover plate is arranged on a side of the support away from the circuit module, and to abut against the isolation members.

* * * * *